(12) United States Patent
Brunotte et al.

(10) Patent No.: US 6,817,357 B2
(45) Date of Patent: Nov. 16, 2004

(54) COLLECTOR MODULE

(75) Inventors: Martin Brunotte, Aalen (DE); Gottfried Haas, Tirschenreuth (DE); Klaus Quast, Mitterteich (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/250,740

(22) PCT Filed: Jan. 23, 2002

(86) PCT No.: PCT/EP02/00644
§ 371 (c)(1),
(2), (4) Date: Jul. 7, 2003

(87) PCT Pub. No.: WO02/059531
PCT Pub. Date: Aug. 1, 2002

(65) Prior Publication Data
US 2004/0050542 A1 Mar. 18, 2004

(30) Foreign Application Priority Data
Jan. 23, 2001 (DE) .......................... 101 02 825

(51) Int. Cl.⁷ ............................... F24J 2/24
(52) U.S. Cl. ...................... 126/655; 126/651
(58) Field of Search ............... 126/655, 651, 126/652

(56) References Cited
U.S. PATENT DOCUMENTS

| 4,282,857 | A | * | 8/1981 | Pei ........................ 126/584 |
| 4,299,203 | A | * | 11/1981 | Skopp ..................... 126/638 |
| 4,346,694 | A | * | 8/1982 | Moan ...................... 126/655 |
| 4,356,815 | A | * | 11/1982 | Spanoudis ................. 126/652 |
| 5,163,821 | A | * | 11/1992 | Kelly et al. .............. 417/379 |
| 6,598,601 | B2 | * | 7/2003 | Schutz .................... 126/655 |

FOREIGN PATENT DOCUMENTS

| DE | 32 06 624 A1 | 9/1982 |
| DE | 91 16 287 U | 6/1992 |
| DE | 26 47 045 A | 6/1997 |
| DE | 297 10 494 U1 | 1/1998 |
| DE | 298 08 532 U1 | 11/1998 |
| DE | 299 08 190 U1 | 9/1999 |
| DE | 201 01 139 U | 7/2001 |
| WO | 83/03891 | 11/1983 |

* cited by examiner

*Primary Examiner*—Alfred Basichas
(74) *Attorney, Agent, or Firm*—Michael J. Striker

(57) ABSTRACT

The invention relates to a collector module (1) comprising a collector pipe (2) which has a inlet (9) and an outlet (10) for the heat transfer medium. Said collector module (1) also comprises at least one co-axially cross-flown collector pipe (3) which has a jacket pipe (4), an absorber pipe (5) and a co-axial pipe (6). The aim of the invention is to produce a collector module which has good mounting qualities as well as good sealing abilities and increased endurance. According to the invention, the outlet (10) comprises at least one hollow nipple (12) which extends in the radial direction of the collector pipe, whereon at least one absorbing pipe (5) is fixed in a co-axial manner, whereby at least one sealing element (15) is arranged between the nipple (12) and the absorbing pipe (5). The inlet (9) comprises at least one element (13, 20) for receiving the co-axial pipe. The at least one co-axial pipe (6) is arranged in a coaxial manner inside the nipple (12) and is pressed against the receiving element (13, 20) by an elastic element (11) disposed on the end of the absorbing pipe (5) opposite the collector pipe (2).

17 Claims, 10 Drawing Sheets

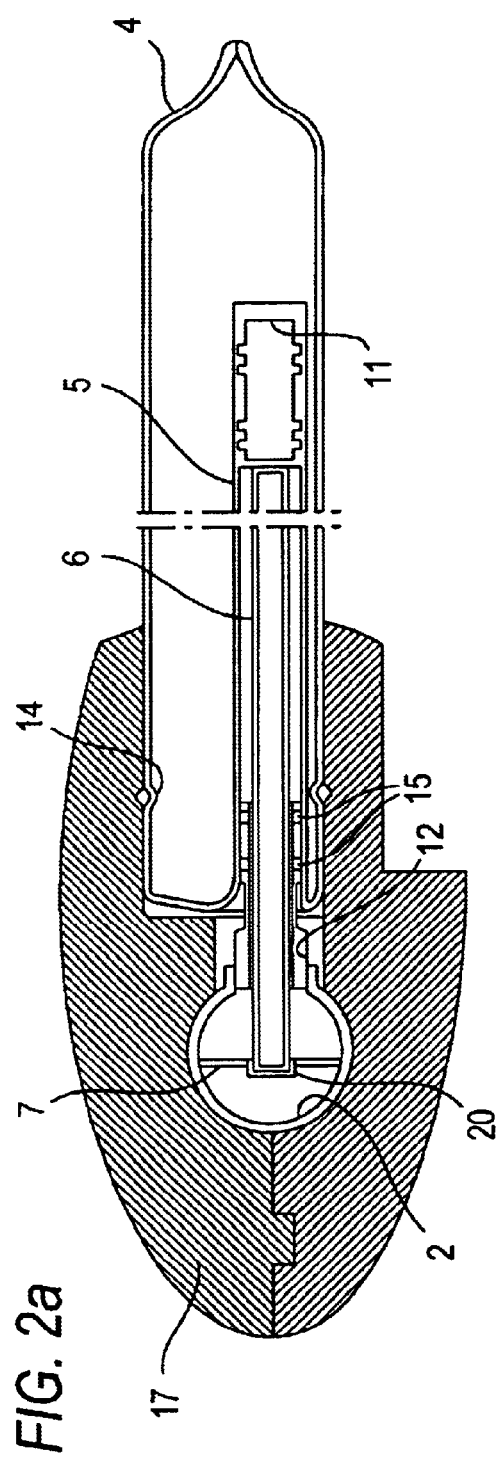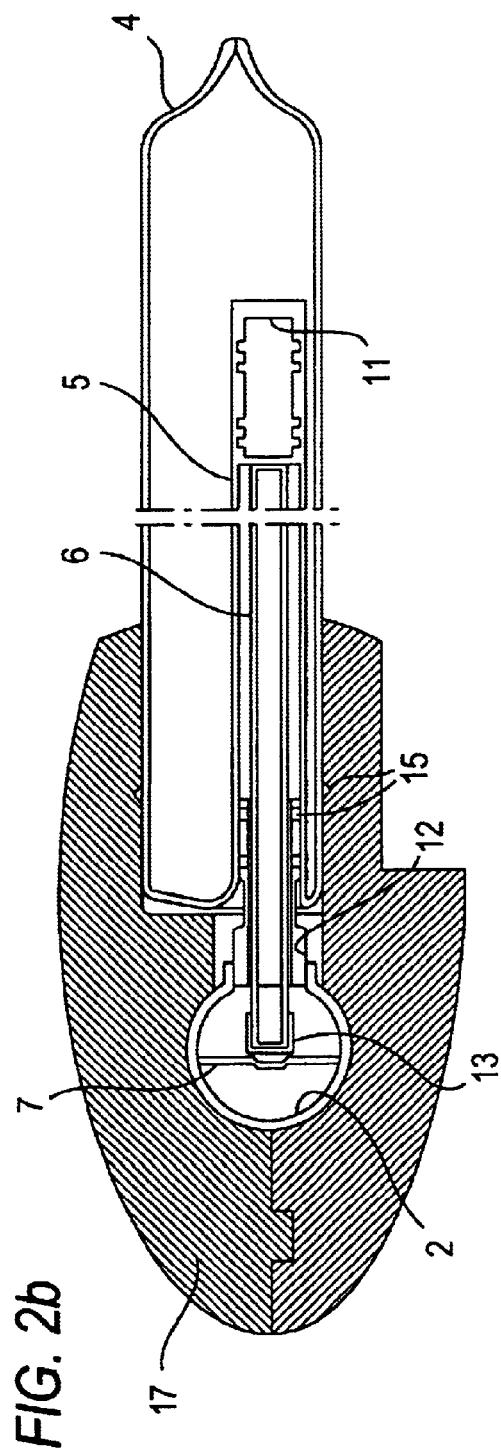

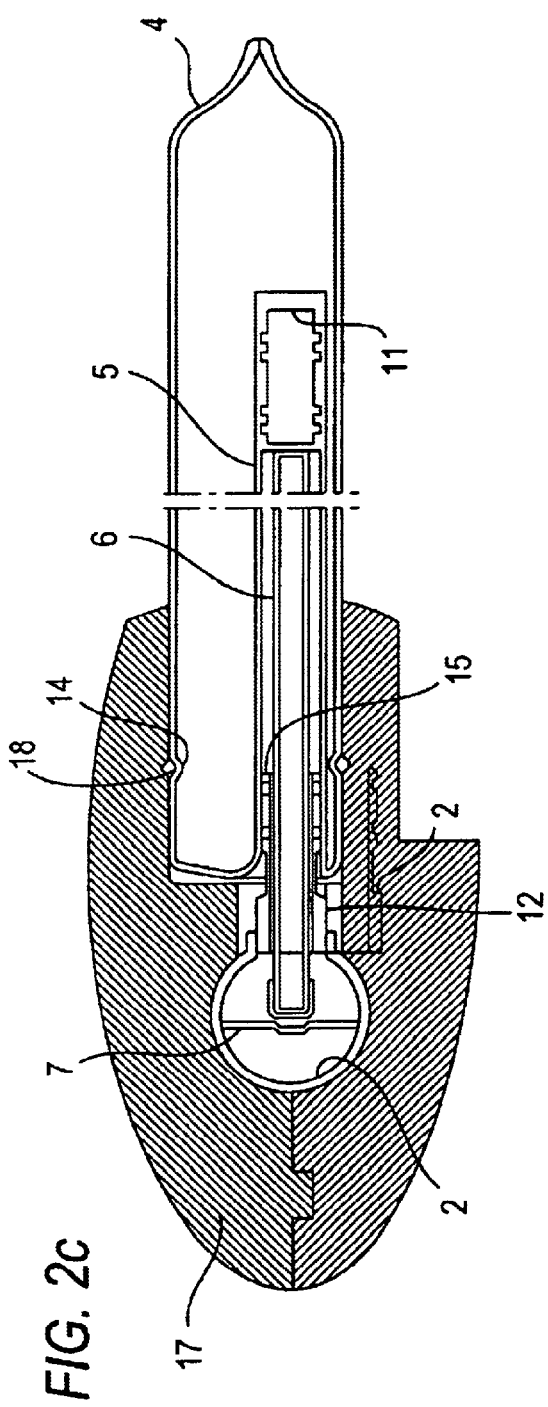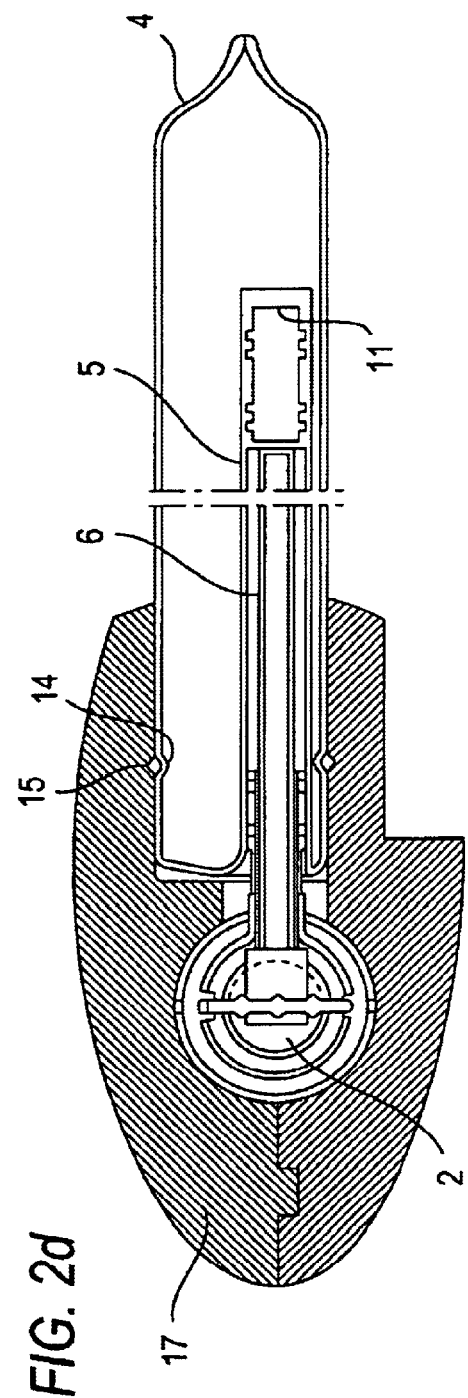

COLLECTOR MODULE

Figure 1:
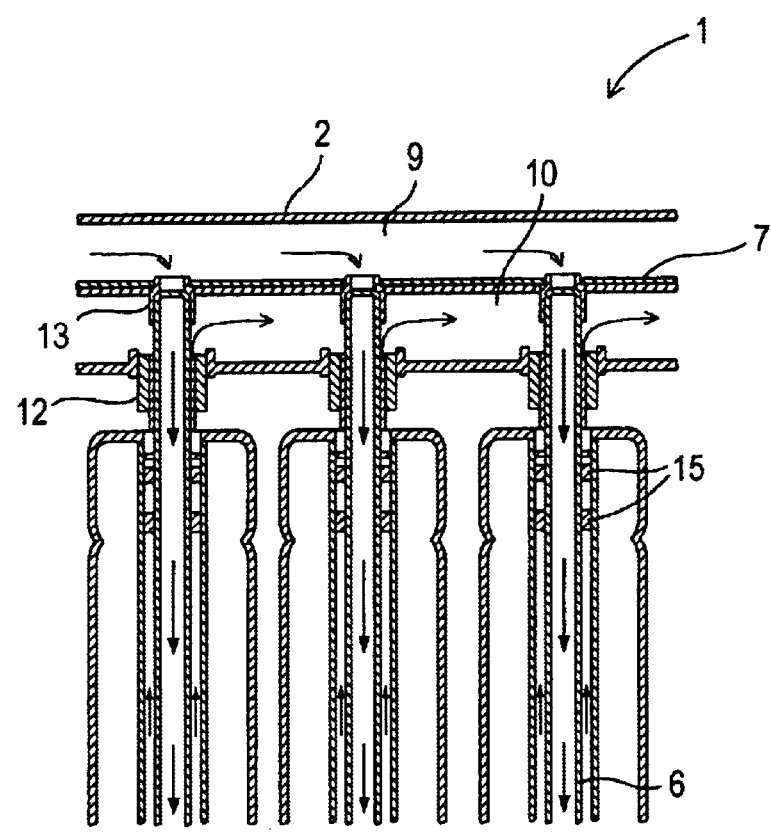
Figure 1:
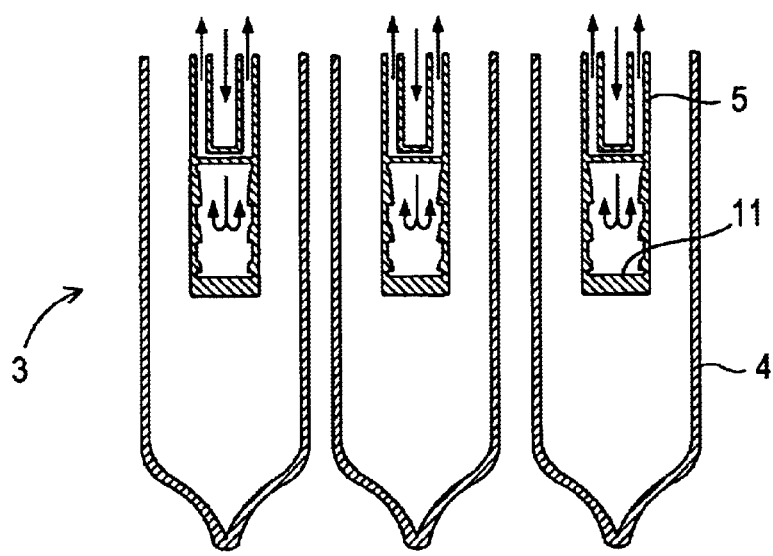

The invention relates to a tubular collector module with a header tube, with has an inlet and an outlet for the heat transfer medium, and having at least one collector tube, through which the flow is coaxial, and which has an envelope tube, an absorber tube, and a coaxial tube.

The collector tubes through which the flow is coaxial belong to the category of collector tubes with an absorber through which the flow is direct. These collector tubes have an envelope tube, an absorber tube, and a coaxial tube. These three tubes are disposed inside one another, with the envelope tube located outermost, the absorber tube located eccentrically or coaxially to the envelope tube, and the coaxial tube located coaxially to the absorber tube. The envelope tube and the absorber tube are sealed off from one another. In the interstice between the envelope tube and the absorber tube, there is either a vacuum or an inert gas. This serves above all to insulate the absorber tube from the environment. The absorber tube is coated with an absorber in order to absorb the solar heat. To transport this heat onward, a heat transfer medium flows through the absorber. In collector tubes in which the flow is coaxial, the heat transfer medium is introduced through a coaxial tube. This is a tube open on both ends, which enters the absorber tube through one of its two ends. The other end of the absorber tube is closed. The end of the coaxial tube that does not protrude into the absorber tube communicates with the inlet of the header tube. The heat transfer medium flows through the inlet into the coaxial tube and from there through the absorber tube and back again to the outlet. From the outlet of the header tube, the heat transfer medium is carried to a heat exchanger, where it gives up the heat to the reservoir.

Various tubular collectors through which the flow is coaxial are available on the market. One widely distributed tubular collector has separate lines for the inlet and outlet of the header tube. Flexible corrugated tubes are used as the inlet and outlet. The absorber tube and the coaxial tube are joined to the inlets and outlets via clamping ring screw fastenings. This type of assembly is very complicated and relatively expensive. The use of separate lines for the inlet and outlet also means increased space is required. Furthermore, if flexible corrugated tubes are used, a housing for the header system must also be provided.

The tubular collectors described above are as a rule constructed as modules comprising a plurality of collector tubes all connected to a common inlet and a common outlet. The individual tubular collector modules can be combined with one another via double O-ring plug-in connections.

In another tubular collector with a flow coaxially through it that is available on the market, the header tube also experiences a coaxial flow through it. Both the absorber tube and the coaxial tube, as well as the outer coaxial tube of the header tube, are embodied integrally as a whole. This does have the advantage that only the envelope tube has to be sealed off from the absorber tube. However, the production of these tubular collectors is very complicated.

A further tubular collector with a flow coaxially through it is described in German Utility Model DE 298 08 532 U1. The header tube in that reference is embodied as a header box assembly. The inlet and the outlet are described as two integrally embodied conduits extending parallel, which are separated only by a wall that has the applicable opening for the various coaxial tubes. The coaxial tube is inserted into the openings in the partition, and the absorber tube is received by an opening in the side wall of the header box, which wall communicates with the outlet conduit, and the envelope tube is received in an extension of the housing. All three tubes are joined by adhesive to the housing parts or header box parts. As a result, it is true that a more-compact design is achieved. However, the seal that is attainable by the adhesive has proved to be inadequate under a high thermal load.

German Utility Model 299 08 190 U1 describes a special clamping system for solar collectors. The vacuum tubes and the tubes of the heat transfer circulation system intersect, touching one another for heat transfer, at an angle of 90°; the intersecting tubes are joined to one another by positive engagement by means of a clamping system, comprising two jaws whose clamping jaws can be prestressed by a tensing mechanism.

German Utility Model DE 297 10 494 U1 discloses a solar collector with a heat pipe, which transfers the heat by evaporation and condensation of a heat-carrying liquid. To avoid overheating, a closure device of bimetal is provided, which if a threshold temperature is exceeded restricts the flow of the heat-carrying liquid from the condenser to the evaporator.

German Patent Disclosure DE 32 06 624 A1 involves a solar energy collector based on an air/water heat exchanger, in which a plurality of collector elements are connected together fluidically. To improve the air circulation, a blower is provided.

International Patent Disclosure WO 83/3891 discloses a tubular solar collector without coaxial tubes in the absorber tubes, which are inclined downward relative to a header tube. The absorber tubes are sealed off from the header tube by means of O-rings.

With this background, it is the object of the present invention to furnish a tubular collector module which intrinsically combines the advantages of simple assembly and good sealing.

This object is attained by a tubular collector module as defined by claim 1.

The tubular collector module of the invention can be assembled very simply. If the coaxial tube is not joined solidly to the absorber tube and to the envelope tube, then the coaxial tube is first introduced through the nipple into the receiving element of the inlet. Next, an elastic element is introduced into the absorber tube, into the end remote from the header system. The absorber tube is then inserted via the coaxial tube and via the nipple of the header system.

By means of the sealing element between the nipple and the absorber tube, no heat transfer medium can escape between the nipple and the absorber tube. The elastic element that is disposed in the absorber tube in turn presses the coaxial tube into the receiving element of the inlet. The heat transfer medium can now flow from the inlet into the coaxial tube, into the absorber tube on the opposite end of the coaxial tube, and back again between the nipple and the coaxial tube into the outlet.

If the collector tube is not joined to the absorber tube, then it is inverted over the absorber tube afterward; if the absorber tube and the collector tube are solidly joined to one another, then the absorber and the collector tube are simultaneously inverted over the coaxial tube and the nipple.

To enable assuring an unimpeded flow of the heat transfer medium even if the elastic element provides strong sealing, the elastic element is advantageously embodied as a spiral spring.

The sealing element is advantageously embodied between the nipple and the absorber tube as at least one O-ring. Thus not only is the best sealing achieved, but O-rings are also economical and simple to install. Moreover, by the selection of a suitable plastic, it is possible to optimize the service life, despite the thermal load during continuous operation.

Advantageously, the at least absorber tube and the at least one envelope tube are embodied integrally. This has the advantage that the vacuum or the inert gas atmosphere that prevails between the absorber tube and the envelope tube, for the sake of achieving good functioning of the solar collector, is not later impaired, for instance by leaks where the absorber tube is joined to the envelope tube.

The collector tube is the envelope tube that is permeable to sunlight. It comprises a transparent material. This is indeed generally a material of low thermal conductivity, but this property is not decisive, since the tube is intended not to heat up severely. Preferably, the envelope tube comprises glass. A low-iron glass (soda lime glass or borosilicate glass) with high solar transmission and low production costs, of the kind for instance used as a primary packaging means for pharmaceutical products, is preferred. The envelope tube can also comprise a transparent plastic, such as polymethylmethacrylate (PMMA). Glass has the advantages over plastic of higher diffusion resistance and higher UV stability; conversely, plastic compared to glass is less breakable and simpler to handle. In most embodiments, the envelope tube is provided with a reflector.

The absorber tube comprises a material with a high temperature resistance (up to at least 250° C.) and low thermal conductivity. Materials with a low thermal conductivity are understood here to mean materials that have a specific thermal conductivity of $\leq 2$ J/msK. Preferably, the internal tube is of glass, preferably borosilicate glass. It can also comprise a temperature-stable plastic. It is provided with an absorber.

Preferably, both the at least one absorber tube and the at least one envelope tube are of glass. The absorber tube and the envelope tube are advantageously fused eccentrically to one another. At the fusing point, to reduce stress in the glass, large radii are provided.

In a preferred embodiment, the header system is embodied as a header tube, which has at least one distributor plate which is disposed in the longitudinal direction in the header tube, so that the header tube is divided into at least one inlet chamber and at least one outlet chamber. The receiving element for the coaxial tube of the inlet chamber is disposed in the distributor plate. By embodying the header system as a single-tube system, only one joining point is needed for each connected collector tube. Moreover, the space required by a single header tube is less, and the installation is less complicated.

Preferably, the distributor plate is of metal. By means of the spring force of the elastic element, the metal distributor plate is additionally pressed against the coaxial tube. If there is a sudden pressure increase (for instance from steam hammer), the distributor plate is deflected by way of the contrary force of the compression spring. This creates a gap between the distributor plate and the header tube along the tube axis, as a result of which a pressure equilibrium between the inlet chamber and the outlet chamber is made possible.

The effect just described above is advantageously reinforced by a suitable fastening of the distributor plate in the header tube, for instance by providing that the distributor plate is joined to the header tube via only two opposed edges, preferably the edges of the distributor plate opposite one another in the axial direction of the header tube.

The distributor plate advantageously has at least one flap, which when it is open connects the at least one inlet chamber and the at least one outlet chamber, and when it is closed disconnects the at least one inlet chamber and the at least one outlet chamber. By means of such a flap on the distributor plate, which is not pressed against the header tube until as a result of the flow of the heat transfer medium, fast venting of the entire system is made possible. Before collection starts, the flap on the distributor plate enables convection between the coaxial tube and the absorber tube. This improves the heat transfer in the collector header tube.

In another preferred embodiment, the distributor plate is replaced by an internal tube disposed in the header tube. The internal tube forms the inlet chamber, and the volume between the internal tube and the header tube forms the outlet chamber.

On the one hand, the internal tube can be embodied cylindrically, and its rear end, in terms of the inlet flow direction, is closed. This closure can for instance be a disk or cap secured by soldering or some other type of fastening. On its open end, conversely, the internal tube is sealed off from the header tube by means of a sealing ring. For better stabilization, the internal tube can additionally be centered on its closed end relative to the header tube by means of a pierced ring. The openings in the centering ring serve to allow the heat transfer medium to flow out.

On the other hand, the internal tube can be embodied essentially cylindrically, and its rear end in terms of the inlet flow direction gradually converges, so that that end is closed. This can be accomplished for instance by pinching the internal tube. On its open end, an internal tube of this kind would be sealed off from the header tube by means of a conical fit.

It has proved to be especially advantageous for the at least one element for receiving the coaxial tube to be embodied either as a bore with a curved indentation or as an open bowl. Receiving elements embodied in this way serve both to guide the coaxial tube and to seal it off.

To enable venting the tubular collector module when the tubular collector module is put into operation, the internal tube advantageously has a small opening on its closed end.

Advantageously, the tubular collector module has a housing, in which both the header system and in part the at least one collector tube are accommodated. The housing serves to stabilize the tubular collector module mechanically as a whole. It is advantageous if the envelope tube is joined to the housing. The joining can be embodied by positive engagement by making a toroidal groove in the envelope tube in the housing, and either a toroidal bulge in the housing or an O-ring groove with O-rings is provided. Nonpositive connections are also possible, and they can for instance be embodied as an O-ring on the envelope tube and an O-ring groove in the wall of the housing.

Another possible way of joining the envelope tube to the housing is to attach clips, securing rings, and/or securing bars to the envelope tube that at the same time are let into the housing. For additional security, a hoop can be placed around the header system, particularly when it is embodied as an header tube, and this hoop can be secured to the safety bar. These securing elements absorb the forces that can occur for instance from the overpressure prevailing in the system or from the thermal changes in length of individual components.

In tubular collector modules with more than one collector tube, the individual collector tubes are preferably connected parallel to one another; all the collector tubes are supplied with heat transfer medium from the same inlet, and the heat transfer medium flows out of all the collector tubes into the same outlet. Individual tubular collector modules can be connected in series with one another.

The tubular collector modules can communicate with one another via a plug-in system attached directly to the header system. Double O-ring systems are especially preferred. It can also be advantageous to place a clamp around the connection.

Figure 3:
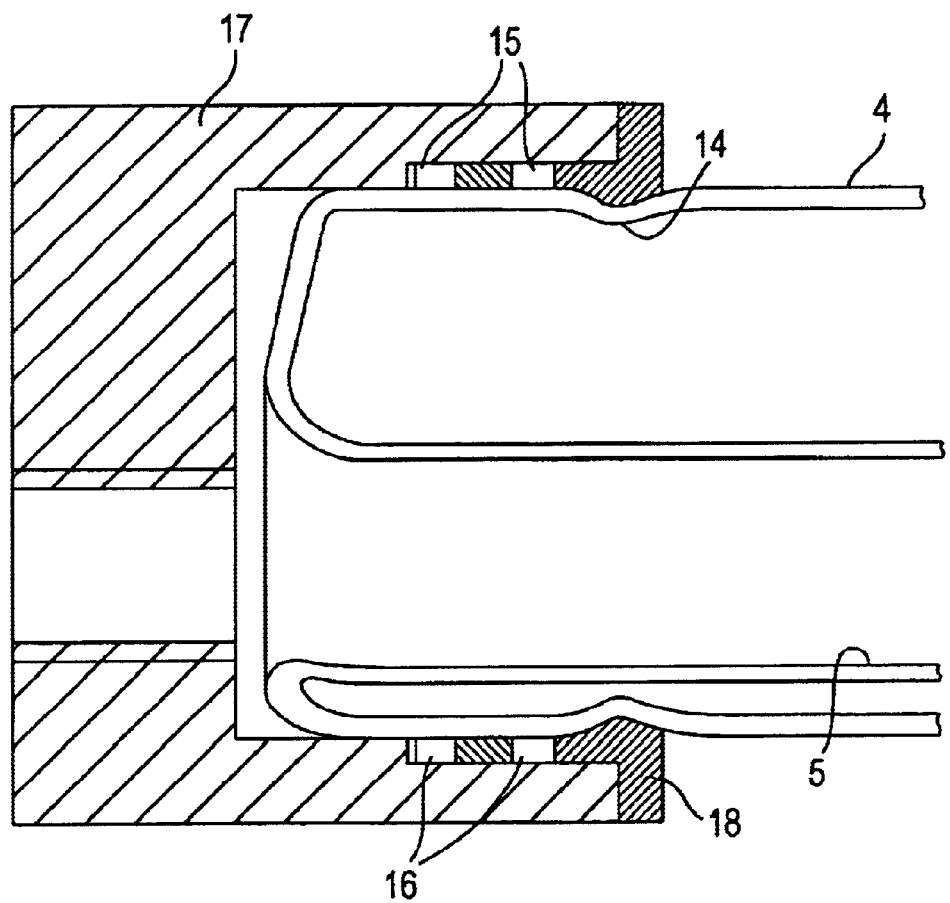
Figure 4A:
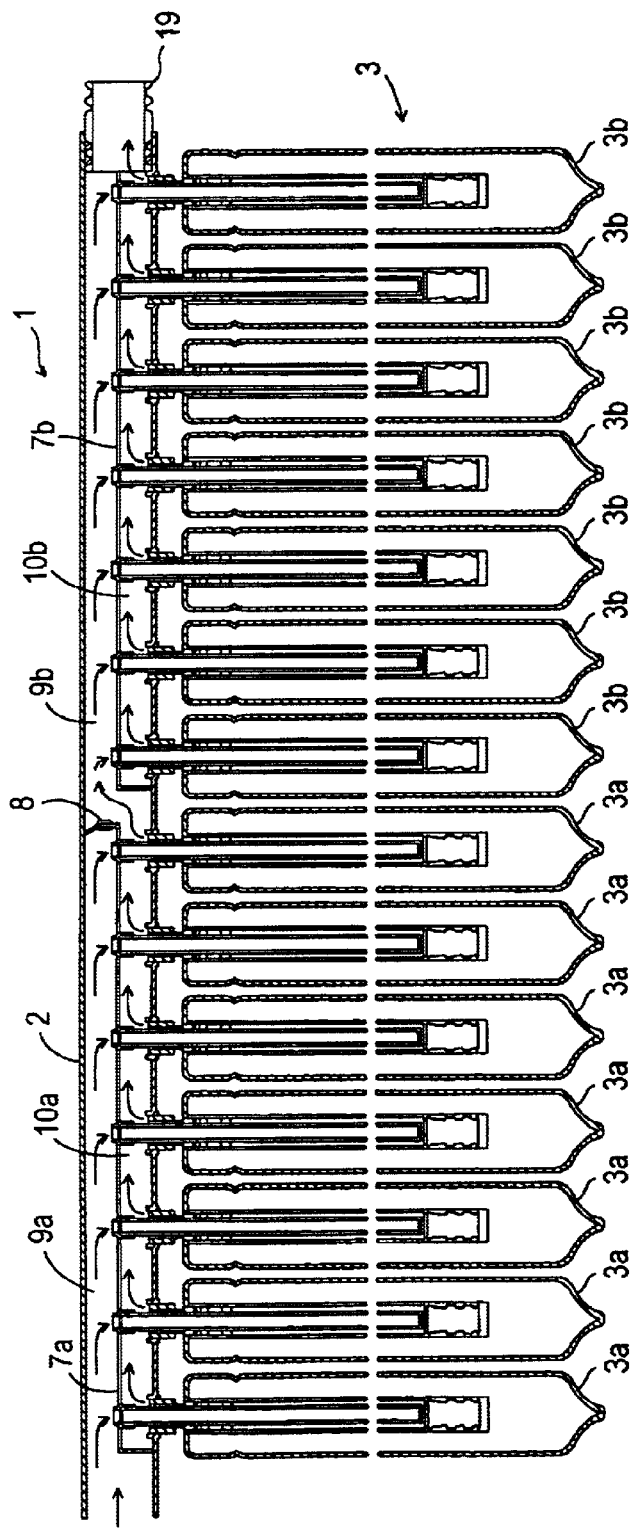
Figure 4B:
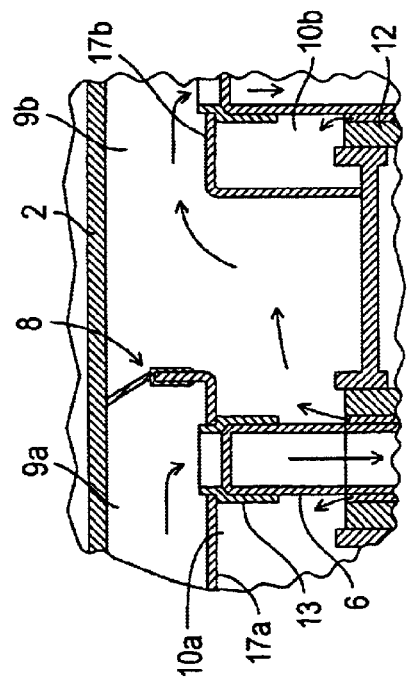
Figure 5A:
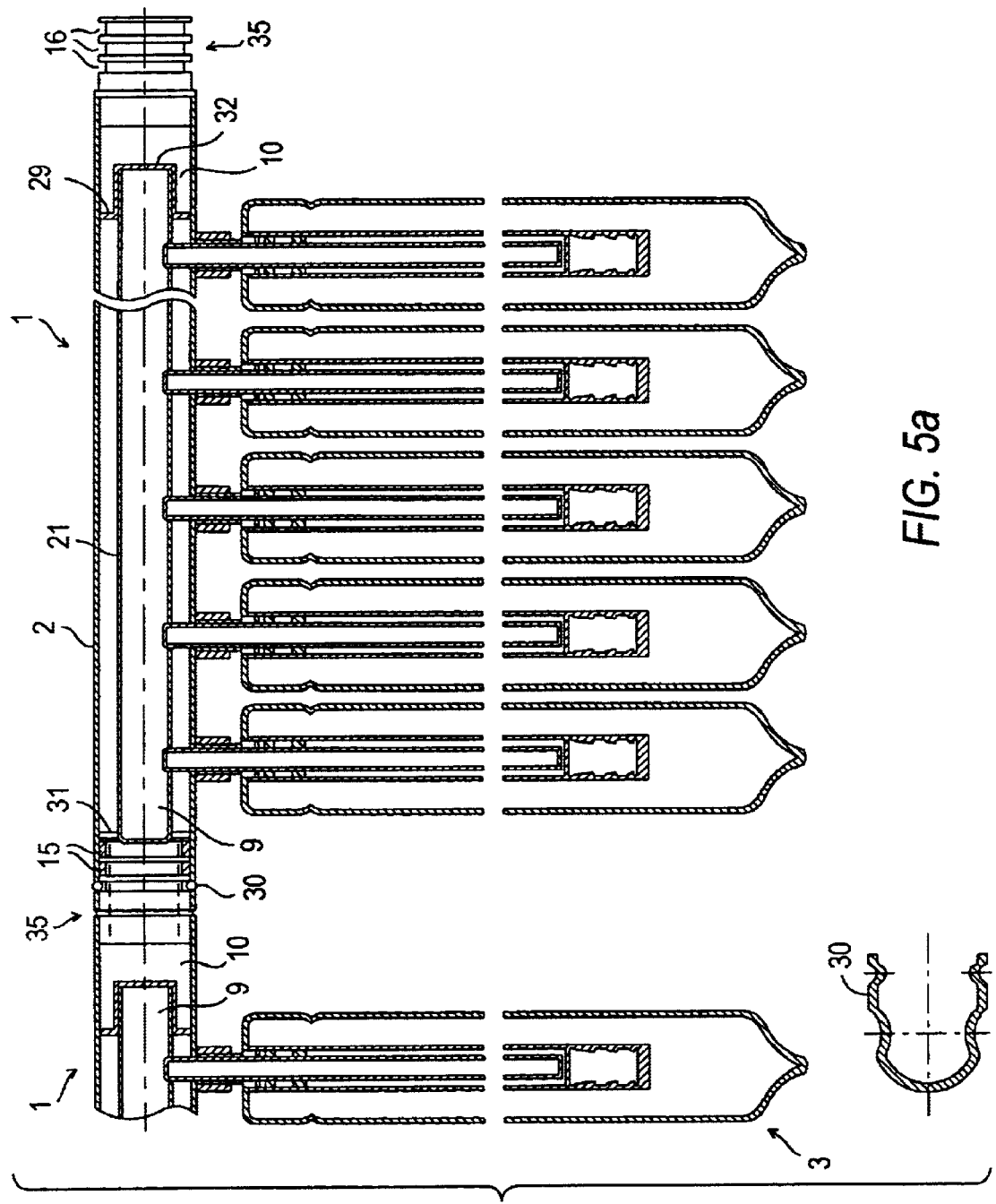

The subject of the invention will now be described as an example in conjunction with the drawings that follow. Shown are:

FIG. 1, a section through a tubular collector module in the plane of the flow;

FIGS. 2a–2g, sections perpendicular to the plane of the flow through various embodiments of a tubular collector module;

FIG. 3, one possible connection of the envelope tube to the housing;

FIGS. 4a, 4b, the fluidic interconnection of collector tubes in a tubular collector module with the aid of distributor plates;

FIGS. 5a, b, the interconnection of a plurality of tubular collector modules.

FIG. 1 shows a tubular collector module 1 with collector tubes 3. The heat transfer medium flows through the inlet chamber 9 into the coaxial tubes 6 of the individual collector tubes 3, flows through each coaxial tube 6 up to the opposite end of that tube from the inlet chamber 9, where it flows out of the coaxial tube 6 and through the absorber tube 5 of each collector tube 3 back into the outlet chamber 10, which is disposed parallel to the inlet chamber 9. From there, the heat transfer medium is delivered to a device for converting the heat into energy or to a heat exchanger.

The inlet chamber 9 and the outlet chamber 10 are formed by a header tube 2, which is divided by a distributor plate 7 into two halves, namely the inlet chamber 9 and the outlet chamber 10. The distributor plate 7 has openings with rivets 13 for receiving the coaxial tubes 6. The coaxial tubes 6 are inserted into the rivets 13 and are pressed against the rivets 13 and the distributor plate 7 by springs 11, which are disposed in the absorber tubes 5 on the opposite end from the header tube 2, so that a sealing function is obtained.

The absorber tube 5 is embodied integrally of glass together with the envelope tube 4. The unit comprising the absorber tube 5 and the envelope tube 4 is sealingly joined together via nipples 12, which are provided in the header tube 2 and each have two O-rings 15. The heat transfer medium can flow through the interstice between the inner wall of the nipple 12 and the outer wall of the coaxial tube 6 into the outlet chamber 10.

In FIGS. 2a–g, sections are shown perpendicular to the plane of the flow of heat transfer medium, through various embodiments of the tubular collector module at the site of a collector tube. In all seven embodiments, the inlet chambers and outlet chambers are formed by a header tube, which is divided longitudinally into two chambers by means of a distributor plate 7 or an internal tube 21. A housing 17 embodied in two parts is disposed around the header tube 2. The housing also grips the end of the envelope tube 4 oriented toward the header tube.

In FIGS. 2a and 2d, the envelope tube 4 is joined by positive engagement to the housing 17 because the envelope tube has a toroidal groove and the housing 17 has an O-ring groove. A sealing O-ring 15 is disposed between the toroidal groove 14 and the O-ring groove. In FIG. 2c, the envelope tube 4 is likewise joined to the housing 17 by positive engagement. The envelope tube 4 has a toroidal groove 14, and the housing 17 has a corresponding toroidal bulge 18. The connection between the envelope tube 4 and the housing 17 can also be embodied by nonpositive engagement, as shown in FIG. 2b. To that end, an O-ring 15 is disposed in an O-ring groove in the housing 17, but there is no toroidal groove in the envelope tube 4.

Figure 2E:
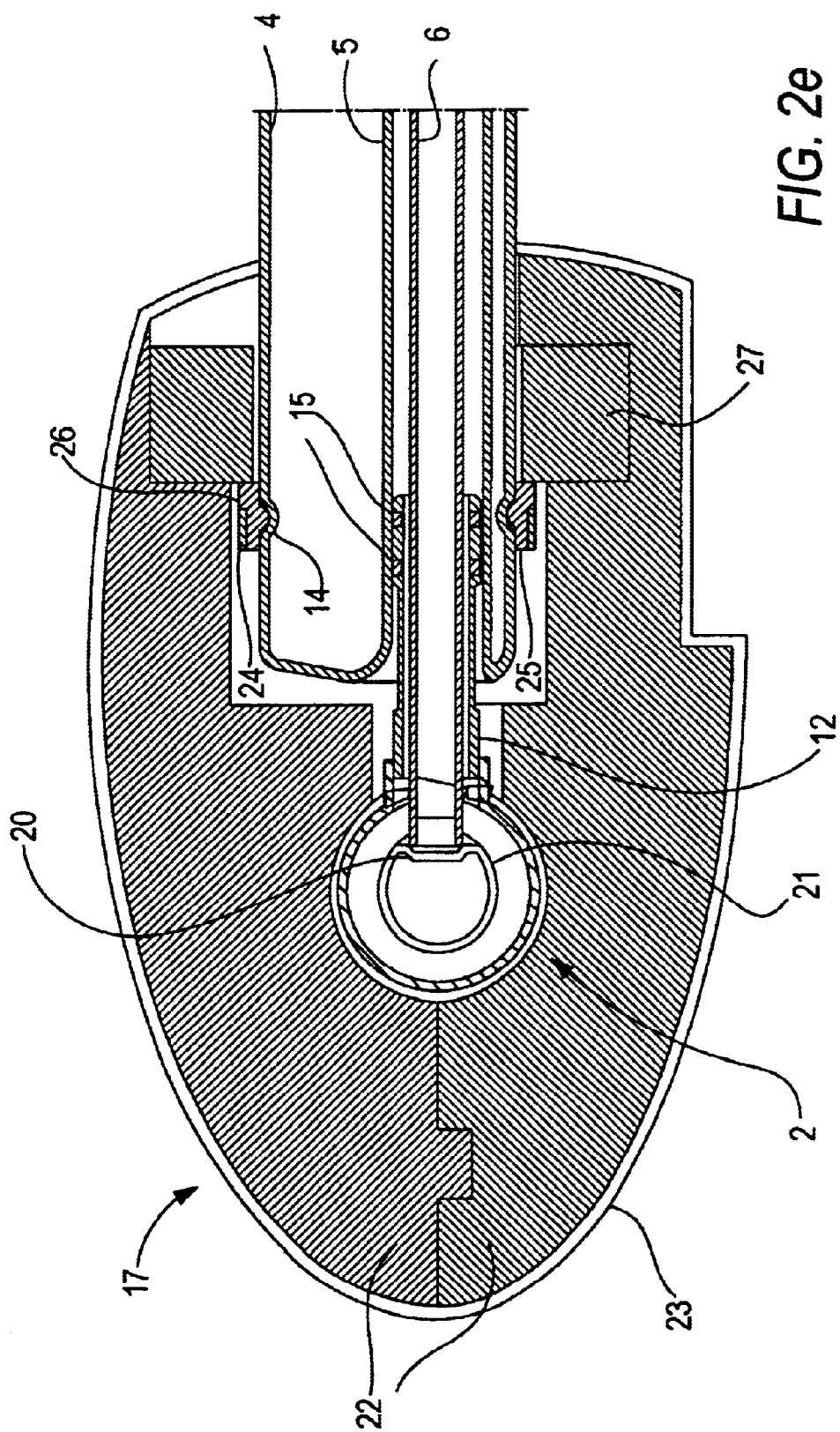
Figure 2F:
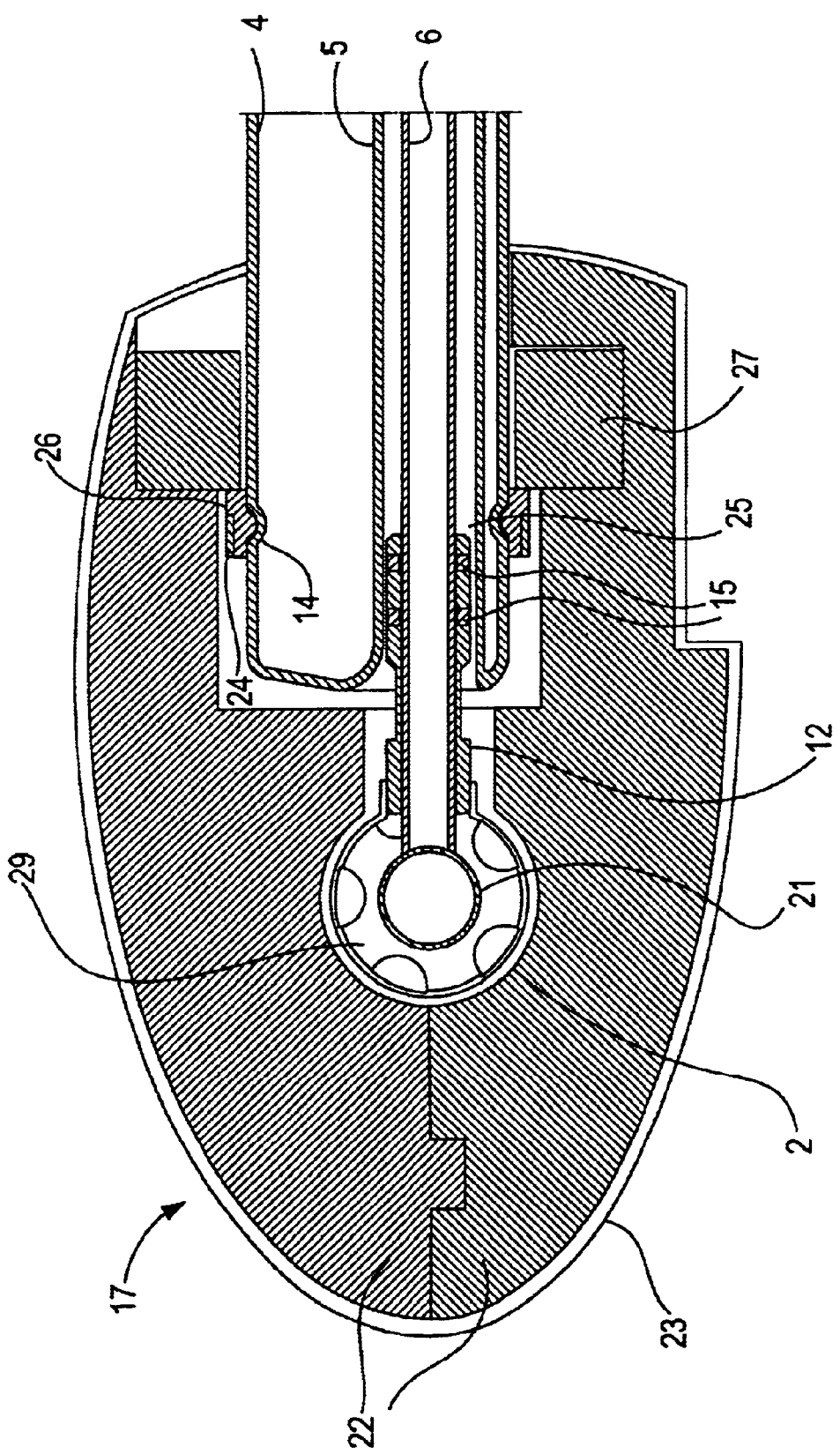
Figure 2G:
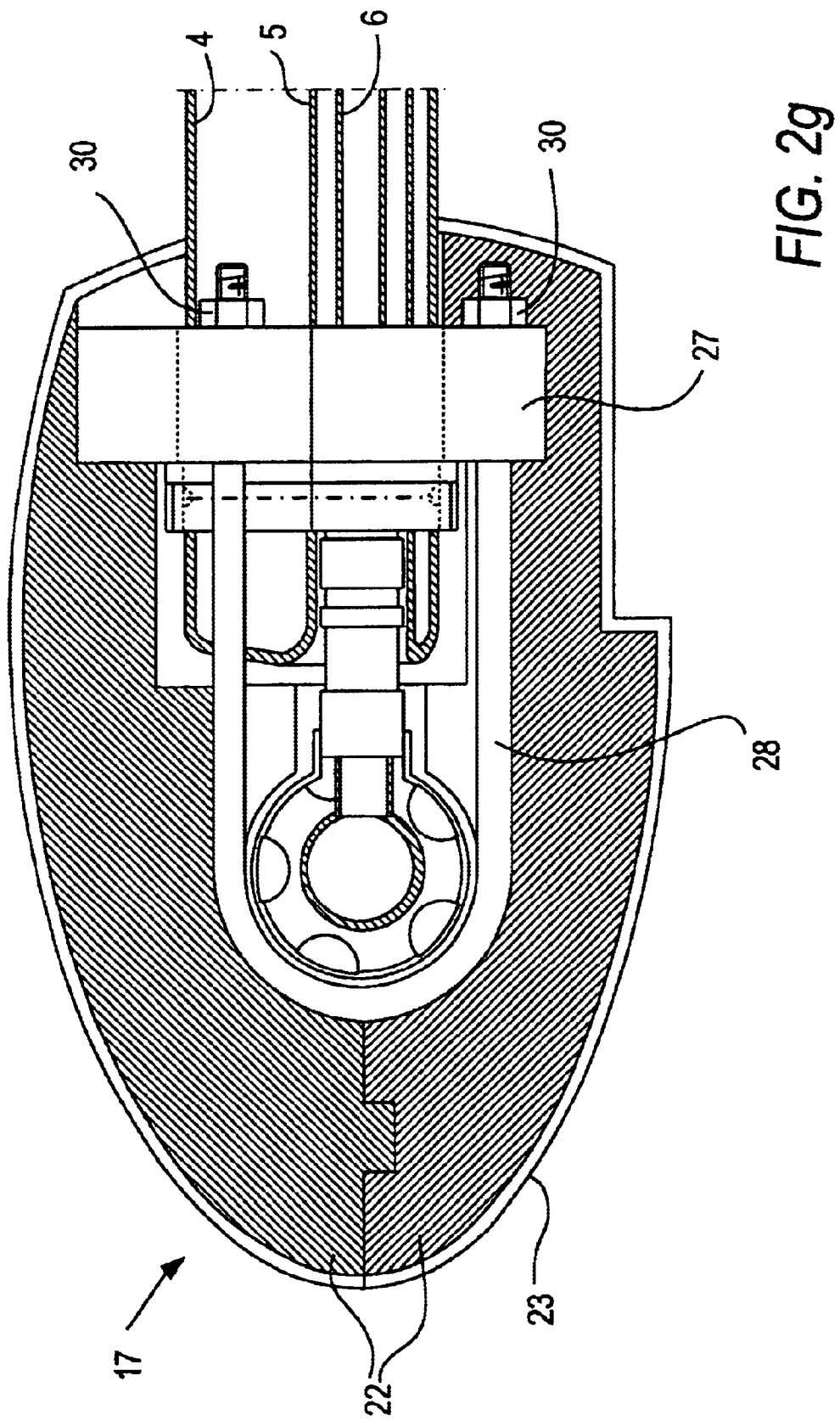

In the embodiments shown in FIGS. 2e–g, a different way of securing the envelope tube 4 to the housing 17 or to the header tube 2 has been selected. A clip 25 is placed in the toroidal groove 14 of the envelope tube 4. The clip 25 is prevented from opening by the securing ring 24. On the side remote from the header tube 2, the clip 25 is provided with a shoulder 26. The envelope tube 4 is inserted with the clip 25 and the securing ring 24 into the bar 27. With the shoulder 26, the entire system is braced on the bar 27. The bores in the bar 27 are disposed such that upon thermal expansion of the header tube 2, the envelope tube 4 has sufficient freedom of motion. The changes in length that can occur from the change in length particularly of the header tube 2 are compensated for as a result.

Forces of extraction between the header tube 2 and the collector tube out of the envelope tube 4, the absorber tube 5 and the coaxial tube 6 are engendered by the overpressure that also prevails in the system. To intercept these extraction forces, the bar 27 is fixed to the header tube 2 with the aid of the hoop 28 (see FIG. 2g). To that end, the hoop 28 is secured to the bar 27 with the aid of nuts 30. The tubular collector module thus installed can then be placed in the insulating shells 22, which together with the outer housing wall 23 form the housing 17.

One particular advantage of this mode of fastening is that the individual components have freedom of motion in all directions, which makes stress-free installation of the tubular collector modules on a roof possible. All the embodiments 2a–g have the advantage that individual collector tubes in already-installed systems can easily be replaced.

In all seven embodiments, the sealing off of the absorber tube is assured via a nipple 12, which is soldered to the header tube 2 and has two O-rings 15 over which the absorber tube is inverted. The coaxial tube 6 disposed in the absorber tube 5 is received in the embodiments shown in FIGS. 2a–d either by rivets 13 disposed in the distributor plate 7 or by receiving elements 20 that are produced by deep drawing of the distributor plate 7, if the distributor plate is of metal. For sealing off and fixing the collector tube in the distributor plate 7 or the receiving element 20 or the rivet 13, the coaxial tube 6 is pressed against the receiving element 20 or the rivet 13 by a spring, disposed in the absorber tube 5 on the end opposite from the header tube 2. In the case where the distributor plate is embodied of plastic, as shown in FIG. 2d, the coaxial tube 6 is also pressed against the receiving element, embodied in the distributor plate, via the spring 11.

In the variants, shown in FIGS. 2e–g, that have an internal tube 21, the element 20 for receiving the coaxial tube 6 is embodied either as a bowl with a pierced bottom, as shown in FIG. 2e, or simply as a bore with an arched or oblique indentation, as in FIGS. 2f and g. As a result, the coaxial tube 6 is both guided and sealed off.

In all seven embodiments shown in FIGS. 2a–2g, a primary consideration is that the individual components of the tubular collector module be capable of being joined tightly to one another simply by being slipped onto one another.

In FIG. 3 it is shown once again how the connection between the envelope tube 4 and the housing 17 can be embodied by positive engagement. The positive engagement is accomplished by means of the toroidal bulge 18, which engages the toroidal groove 14 in the envelope tube 4. For sealing off from the outside, conversely, grooves 16 for receiving O-rings 15 are provided in the housing 17. These O-rings 15 press against the outer wall of the envelope tube 4 and as a result bring about sealing between the housing 17 and the envelope tube 4.

In FIG. 4a, a tubular collector module 1 is shown which has fourteen collector tubes 3a, b. The inlet chambers 9a, b and outlet chambers 10a, b are formed by a header tube 2, which is divided into the various chambers by two distributor plates 7a and 7b.

Through the first inlet chamber 9a in terms of the flow direction of the heat transfer medium, the first seven collector tubes 3a are supplied with heat transfer medium. The heat transfer medium flows out of all seven collector tubes 3a via the outlet chamber 10a. In other words, the first seven collector tubes 3a are connected parallel to one another.

The outlet chamber 10a discharges into the second inlet chamber 9b. Via the inlet chamber 9b, the remaining seven collector tubes 3b are supplied with heat transfer medium. The heat transfer medium flows out of all these seven collector tubes 3b and out through the outlet chamber lob. Via the plug connector 19, the heat transfer medium is carried away for further utilization of its heat.

In the tubular collector module 1 shown in FIG. 4a, seven collector tubes each are connected parallel with one another to form units 7a and 7b, and these units are in turn interconnected in series among one another. As a result, more-efficient utilization of the heat can be achieved, since the heat transfer medium that flows into the second unit 7b comprising the collector tubes 3b has already been preheated by flowing through the first unit 7a comprising seven collector tubes 3a.

The inlet chamber 9a is separated from the inlet chamber 9b by a flap 8. This flap is shown enlarged in FIG. 4b. The flap 8 is disposed in the header tube 2 in such a way that it is pressed by the flowing heat transfer medium against the header tube 2 and thus tightly separates the inlet chamber 9a from the inlet chamber 9b. Upon filling of the tubular collector module 1, the flap 8 opens, so that faster venting of the entire tubular collector module 1 is made possible.

In FIG. 5a, tubular collector modules 1 are shown in which the header system is embodied as a header tube 2 and an internal tube 21. The interior of the internal tube 21 forms the inlet chamber 9; the interstice between the internal tube 21 and the header tube 2 forms the outlet chamber 10. The inlet chamber 9 is sealed off from the outlet chamber 10 via the sealing ring 31 and the soldered cap 32. For mechanical stabilization of the internal tube 21, a centering ring 29 is also provided on the end of the internal tube 21 that is covered by the soldered cap 32. The centering ring 29 has openings, so that the heat transfer medium can flow unimpeded into the outlet chamber 10. Tubular collector modules 1 can be joined to one another via the connecting elements 35. The connecting element 35 shown in FIG. 5a is solidly joined to the header tube 2 of the one tubular collector module 1. Each connecting element 35 has three grooves 16, two of which each receive one O-ring 15. The third groove 16 is intended for receiving the clamp 30. While the O-rings 15 above all have sealing functions, the clamp 30, which in the lower part of the drawing is also shown enlarged and from the side, serves the purpose of actually fastening one tubular collector module 1 to the other tubular collector module 1. With the aid of the clamp 30, the tubular collector modules 1 are secured to one another against being unintentionally pulled apart.

Figure 5B:
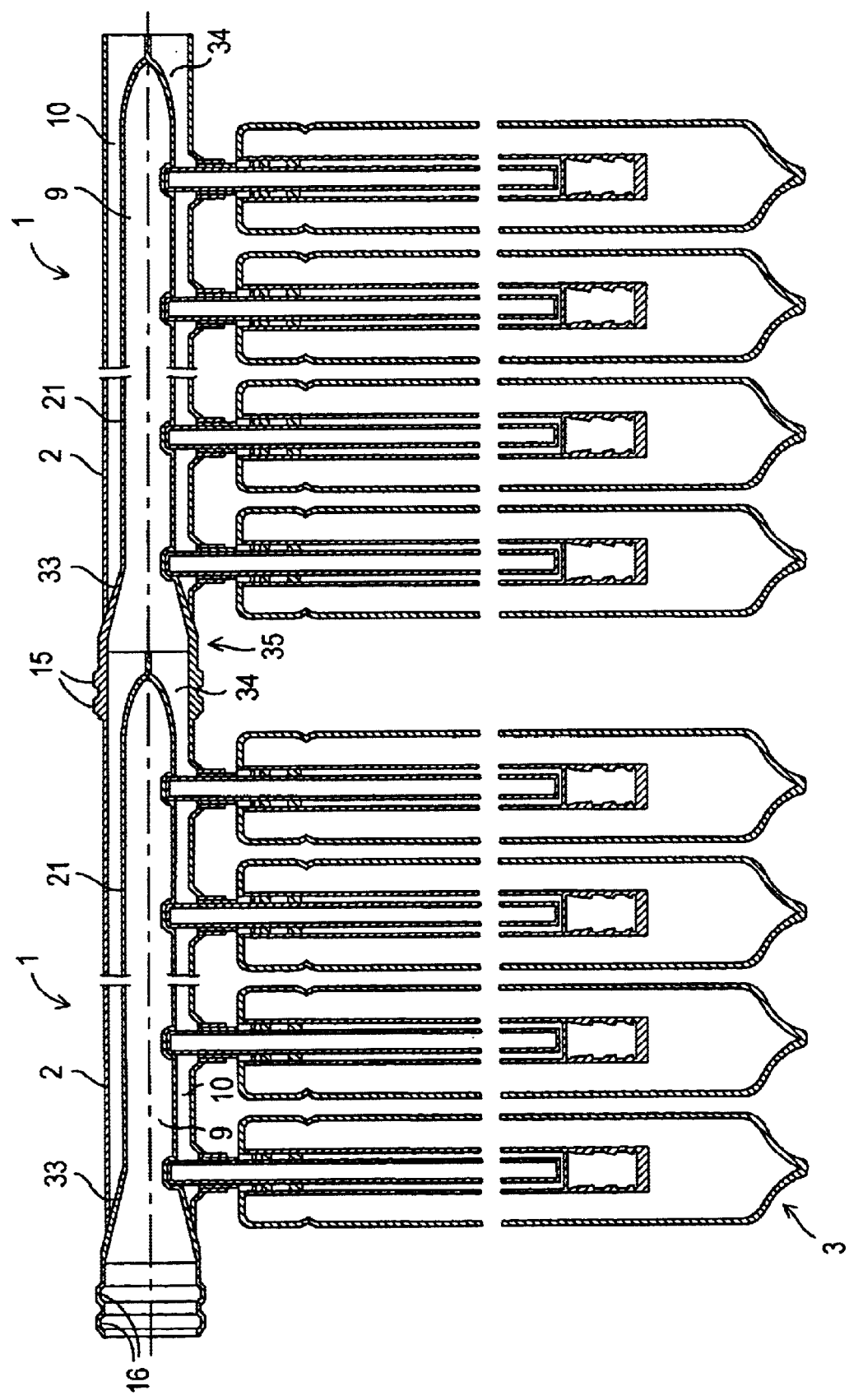

In FIG. 5b, two tubular collector modules 1 are also shown that are joined together. These are tubular collector modules in which the header tube 2 and the internal tube 21 have been produced by internal high-pressure creative forming. The internal tube 21 is sealed off from the header tube 2 via a conical fit 33, on the one hand, and on the other is sealed off via a pinch on the opposite end 34 of the internal tube. As a result, the internal tube 21 forms the inlet chamber 9. The interstice between the internal tube 21 and the header tube 2 forms the outlet chamber 10. Once again, the connecting element 35 between the two tubular collector modules 1 is a double O-ring plug-in connection. The end of the header tube 2 on which the conical fit 33 of the internal tube 21 is located has internal grooves 16 for receiving O-rings. This end together with the O-rings 15 is thrust onto one end, not further machined, of the header tube, on the closed internal tube side of a further tubular collector module 1.

Regardless of its specific embodiment, the internal tube 21 can have a small opening on its rear end in terms of the flow direction, which when the collector is put into operation makes faster venting of the tubular collector module 1 possible.

What is claimed is:

1. A tubular collector module with a header system (2), with has an inlet (9) and an outlet (10) for the heat transfer medium, and having at least one collector tube (3), through which the flow is coaxial, and which has an envelope tube (4), an absorber tube (5), and a coaxial tube (6), wherein
   the outlet (10) has at least one hollow nipple (12), which extends in the radial direction of the header system (2) and onto which at least one absorber tube (5) is slipped coaxially, and at least one sealing element (15) is disposed between the nipple (12) and the absorber tube (5);
   that the inlet (9) has at least one element (13, 20) for receiving the coaxial tube (6); and
   that the at least one coaxial tube (6) is disposed coaxially inside the nipple (12) and is pressed against the receiving element (13, 20) by an elastic element (11) on the end of the absorber tube (5) remote from the header system (2).

2. The tubular collector module of claim 1, wherein the elastic element is embodied as a spring (11).

3. The tubular collector module of one of claims 1, wherein the at least one sealing element is embodied as at least one O-ring (15).

4. The tubular collector module of one of claims 1, wherein the at least absorber tube (5) and the at least one envelope tube (4) are embodied integrally.

5. The tubular collector module of claim 1, wherein the at least one absorber tube (5) and the at least one envelope tube (4) are of glass.

6. The tubular collector module of claim 1, wherein the header system is embodied as a header tube (2), which has at least one distributor plate (7) which is disposed in the longitudinal direction in the header tube (2), so that the header tube (2) is divided into at least one inlet chamber (9) and at least one outlet chamber (10), and the distributor plate (7) has at least one element for receiving the coaxial tube (6).

7. The tubular collector module of claim 6, wherein the distributor plate (7) is of metal.

8. The tubular collector module of one of claims 1, wherein the header system is embodied as a header tube (2), which has a coaxially disposed internal tube (21) which is disposed in the longitudinal direction in the header tube (2), so that the header tube (2) is divided into at least one inlet chamber (9) and at least one outlet chamber (10), and the internal tube (21) has at least one element (13, 20) for receiving the coaxial tube (6).

9. The tubular collector module of claim 8, wherein the internal tube (21) is embodied cylindrically, and its rear end, in terms of the inlet flow direction, is closed.

10. The tubular collector module of claim 8, wherein the internal tube (21) is sealed off at its open end from the header tube (2) by means of a sealing ring (31).

11. The tubular collector module of one of claim 8, wherein the internal tube (21) is centered on its closed end relative to the header tube (2) by means of a pierced ring (29).

12. The tubular collector module of claim 8, wherein the internal tube (21) is embodied essentially cylindrically, and its rear end in terms of the inlet flow direction converges, so that that end is closed.

13. The tubular collector module of claim 8, wherein the internal tube (21) is sealed off on its open end from the header tube (2) by means of a conical fit (33).

14. The tubular collector module of claim 8, wherein the at least one receiving element (13, 20) is embodied as a bore with a curved indentation.

15. The tubular collector module of claim 8, wherein the at least one receiving element (13, 20) is embodied as an opened bowl.

16. The tubular collector module of claim 1, wherein it has a housing (17), in which both the header system (2) and in part the at least one collector tube (3) are accommodated.

17. The tubular collector module of claim 16, wherein the envelope tube (4) is joined to the housing (17).

* * * * *